US012703227B2

(12) United States Patent
Arai et al.

(10) Patent No.: US 12,703,227 B2

(45) Date of Patent: Aug. 11, 2026

(54) ON-BOARD AIR CONDITIONING SYSTEM

(71) Applicants: TOYOTA JIDOSHA KABUSHIKI KAISHA, Aichi-ken (JP); SUMITOMO WIRING SYSTEMS, LTD., Mie-ken (JP)

(72) Inventors: Yuuki Arai, Toyota (JP); Masaaki Aoki, Nagoya (JP); Hisao Takahashi, Toyota (JP); Yasunori Wakamatsu, Nagakute (JP); Tadashi Naruse, Yokkaichi (JP); Akihiro Kusada, Yokkaichi (JP)

(73) Assignees: TOYOTA JIDOSHA KABUSHIKI KAISHA, Aichi-Ken (JP); SUMITOMO WIRING SYSTEMS, LTD., Mie-Ken (JP)

( * ) Notice: Subject to any disclaimer, the term of this patent is extended or adjusted under 35 U.S.C. 154(b) by 49 days.

(21) Appl. No.: 18/895,386

(22) Filed: Sep. 25, 2024

(65) Prior Publication Data

US 2025/0100349 A1 Mar. 27, 2025

(30) Foreign Application Priority Data

Sep. 27, 2023 (JP) ................................ 2023-165885

(51) Int. Cl.
*B60H 1/00* (2006.01)

(52) U.S. Cl.
CPC ................................ *B60H 1/00985* (2013.01)

(58) Field of Classification Search
CPC ............ B60H 1/00985; B60H 1/00007; B60H 1/00642; B60H 1/32; B60W 10/30; B60Q 3/18; B60Q 3/217; B60Q 3/85
See application file for complete search history.

(56) References Cited

U.S. PATENT DOCUMENTS

| | | | | |
|---|---|---|---|---|
| 2003/0142504 | A1 * | 7/2003 | Mueller | B60H 1/00985 362/488 |
| 2009/0093206 | A1 * | 4/2009 | Okita | B60Q 9/00 454/143 |
| 2024/0069512 | A1 * | 2/2024 | Ishikawa | G05B 19/042 |
| 2024/0166127 | A1 * | 5/2024 | Wang | B60Q 9/00 |
| 2025/0010683 | A1 * | 1/2025 | Huang | B60H 1/00028 |

FOREIGN PATENT DOCUMENTS

| | | | | |
|---|---|---|---|---|
| DE | 102015224187 | A1 * | 6/2017 | B60H 1/00985 |
| JP | 2009-090821 | A | 4/2009 | |

* cited by examiner

*Primary Examiner* — Esvinder Singh

(74) *Attorney, Agent, or Firm* — HAUPTMAN HAM, LLP

(57) ABSTRACT

An on-board air conditioning system includes at least one illumination light emitter disposed on at least one of a driver seat door, a front passenger seat door, and a center cluster, and an illumination light controller configured to control the at least one illumination light emitter, in which the illumination light controller changes, when a desired temperature for air conditioning differs from a set temperature stored in a memory, the stored set temperature to the desired temperature, causes the at least one illumination light emitter to illuminate in a first color when the vehicle compartment temperature is lower than the stored set temperature by a predetermined degree or more, and causes the at least one illumination light emitter to illuminate in a second color different from the first color when the vehicle compartment temperature is higher than the stored set temperature by the predetermined degree or more.

4 Claims, 5 Drawing Sheets

ON-BOARD AIR CONDITIONING SYSTEM

CROSS REFERENCE TO RELATED APPLICATION

This application claims priority to Japanese Patent Application No. 2023-165885 filed on Sep. 27, 2023, which is incorporated herein by reference in its entirety including the specification, claims, drawings, and abstract.

TECHNICAL FIELD

The present specification discloses an on-board air conditioning system configured to air condition a vehicle compartment.

BACKGROUND

An on-board air conditioning system is a system for operating an air conditioner to match the temperature of a vehicle compartment to a desired temperature specified by a user. Among such air conditioning systems, there are some air conditioning systems that indicate a state of air conditioning by illumination. For example, Patent Document 1 (JP 2009-090821 A) discloses an air conditioner which changes emission colors of a lamp disposed to illuminate an air blowoff port depending on the temperature of temperature regulated air which is blown from the air blowoff port.

CITATION LIST

Patent Literature

Patent Document 1: JP 2009-090821 A

However, the technique disclosed in Patent Document 1 merely changes the emission colors based on the temperature of temperature regulated air, but does not monitor a difference between a desired temperature and a vehicle compartment temperature. For this reason, the technique of Patent Document 1 cannot allow a user to intuitively recognize the difference between the desired temperature and the vehicle compartment temperature.

Under the circumstances, the present specification discloses an on-board air conditioning system which can allow a user to intuitively perceive a difference between a vehicle compartment temperature and a desired temperature.

SUMMARY

An on-board air conditioning system disclosed herein includes an air conditioner configured to air condition a vehicle compartment, an air conditioner controller configured to control the air conditioner so as to match a vehicle compartment temperature to a desired temperature, at least one illumination light emitter mounted on at least one of a driver seat door, a front passenger seat door, and a center cluster, and an illumination light controller configured to control the at least one illumination light emitter, in which the air conditioner controller is further configured to regularly or irregularly notify the illumination light controller of a value of the desired temperature, and when the notified value of the desired temperature differs from a value of a set temperature stored in a memory, the illumination light controller changes the stored value of the set temperature to the notified value of the desired temperature. In the on-board air conditioning system, under a condition that air conditioning is performed by the air conditioner, the illumination light controller causes the at least one illumination light emitter to illuminate in a first color when the vehicle compartment temperature is lower than the stored set temperature by a predetermined degree or more, and causes the at least one illumination light emitter to illuminate in a second color different from the first color when the vehicle compartment temperature is higher than the stored set temperature by the predetermined degree or more.

According to a technique disclosed herein, the illumination light emitter can be operated to illuminate in a color representing a difference between the set temperature and the vehicle compartment temperature, thereby allowing a user to intuitively perceive the difference between the vehicle compartment temperature and the desired temperature.

BRIEF DESCRIPTION OF DRAWINGS

Embodiments of the present disclosure will be described based on the following figures, wherein.

DESCRIPTION OF EMBODIMENTS

Figure 1:
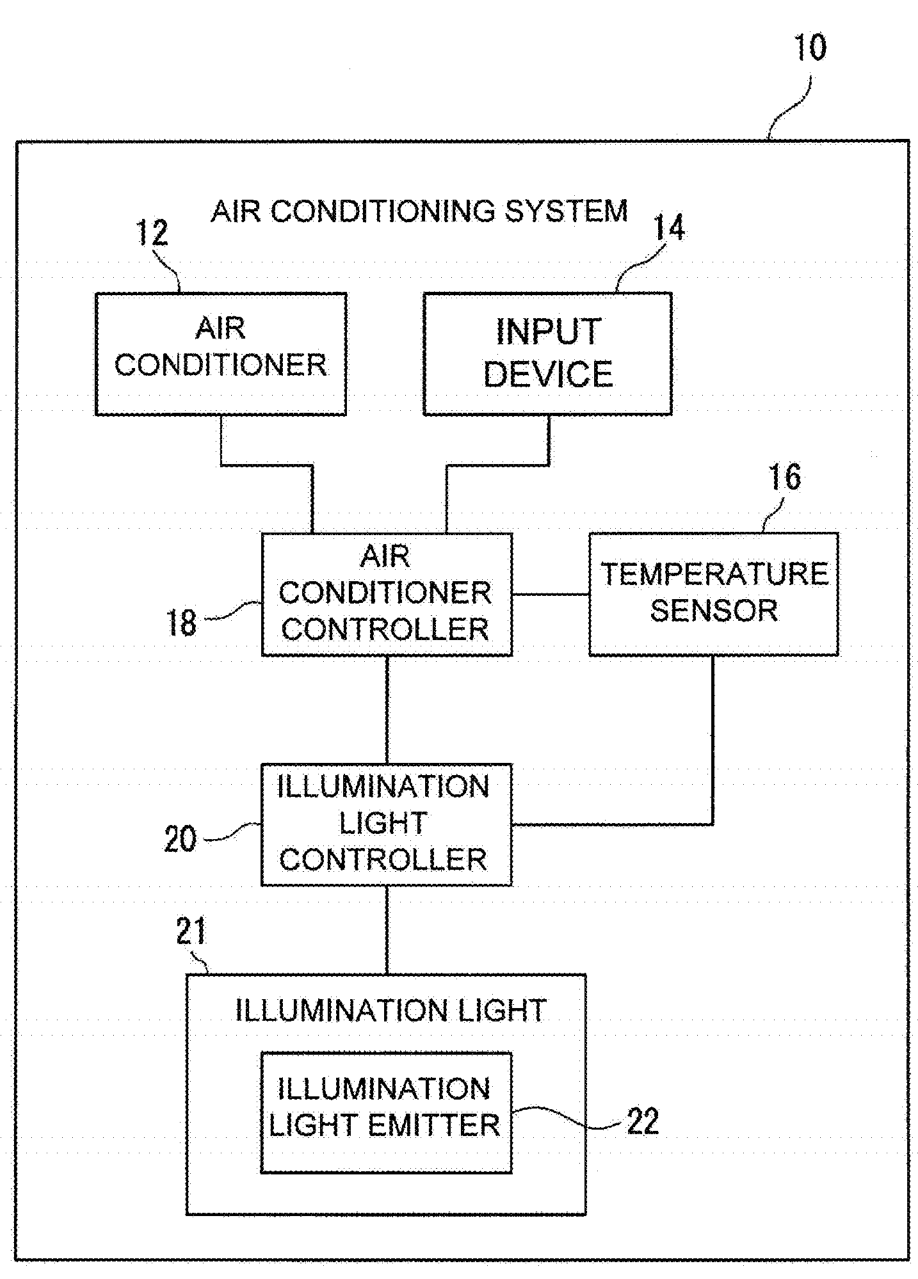
FIG. 1 is a block diagram showing a configuration of an on-board air conditioning system.
Figure 2:
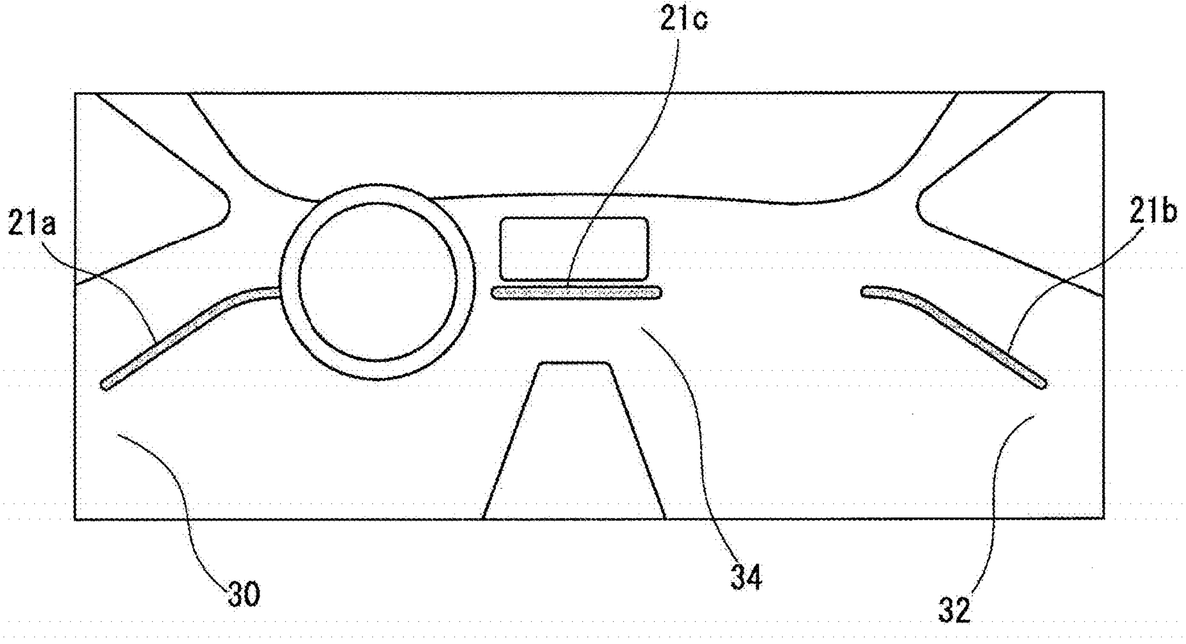
FIG. 2 is a schematic diagram showing a part of a vehicle compartment.

Hereinafter, a configuration of an on-board air conditioning system 10 will be explained with reference to the drawings. FIG. 1 is a block diagram showing a configuration of the air conditioning system 10, and FIG. 2 is a schematic diagram showing a part of a vehicle compartment.

An air conditioner 12 is a device for regulating the temperature of the vehicle compartment. For example, in accordance with an instruction from an air conditioner controller 18, the air conditioner 12 regulates the temperature of air and blows the temperature-regulated air into the vehicle compartment. The air conditioner 12 includes, for example, a heater, a heat pump circuit, a blower, and other components. It should be noted that operation of the air conditioner 12 may be independently controllable in each area of the vehicle compartment. For example, air conditioning for a driver seat area may be activated while air conditioning for a front passenger seat area may be deactivated. In addition, different desired temperatures T* may be set for the driver seat area and the front passenger seat area.

An input device 14 is configured to receive an instruction from a user. The input device 14 includes, for example, at least one of a mechanical switch (such as, for example, a push down switch or a rotary switch), a touch panel, and a microphone. The user operates the input device 14 to input an instruction for air conditioning. For example, by the input device 14 the user inputs instructions for turning on/off air conditioning, specifying the desired temperature T* for air conditioning, turning on/off air conditioning linked illumination control which will be described below, and other instructions. The instruction input through the input device 14 by the user is output to the air conditioner controller 18. It should be noted that when the air conditioner 12 is configured to be independently controllable for each area in the vehicle compartment, the instructions for air conditioning may be specified on an area-by-area basis for the areas of the vehicle compartment. In this case, the input device 14 may be installed in each of the areas of the vehicle compartment.

A temperature sensor 16 is provided to detect the temperature within the vehicle compartment. Hereinafter, a temperature detected by the temperature sensor 16 is referred to as a "vehicle compartment temperature Td". The temperature sensor 16 is not limited to one temperature sensor, and two or more temperature sensors 16 may be installed. The vehicle compartment temperature Td acquired from the temperature sensor 16 is output to the air conditioner controller 18 and an illumination light controller 20.

The air conditioner controller 18 controls the air conditioner 12. The air conditioner controller 18 is physically a computer incorporating a processor and a memory. The air conditioner controller 18 controls operation of the air conditioner 12 to match the vehicle compartment temperature Td with the desired temperature T* instructed by the user.

The air conditioning system 10 further includes a plurality of illumination lights 21, and the illumination light controller 20. The illumination lights 21 are lighting fixtures mounted on the interior of the vehicle compartment for the purpose of decoration or information transfer. In this example, as shown in FIG. 2, the illumination lights 21 include a driver seat illuminating light 21*a* attached to a driver seat door 30, a front passenger seat illuminating light 21*b* attached to a front passenger seat door 32, and a center illuminating light 21*c* attached to a center cluster 34.

Each of the illumination lights 21 includes an illumination light emitter 22. Emission colors illuminated by the illumination light emitter 22 can be changed. For example, the illumination light emitter 22 has a red LED chip, a green LED chip, and a blue LED chip, and the emission colors can be changed by varying the amount of an electric current fed through each LED chip among the red, green, and blue LED chips. The plurality of illumination lights 21 may be lit up in synchronization with one another or may be lit up independently of one another. For example, the driver seat illuminating light 21*a* and the front passenger seat illuminating light 21*b* may be operated in synchronization with each other to illuminate in the same color. Alternatively, the front passenger seat illuminating light 21*b* may be asynchronous with the driver seat illuminating light 21*a*, and may illuminate in a different color at a different time with respect to those of the driver seat illuminating light 21*a*.

The illumination light controller 20 controls the turning on of the illumination light emitter 22 and emission colors thereof. The illumination light controller 20 is physically a computer incorporating a processor and a memory. In this example, when the user provides an instruction to turn on the air conditioning linked illumination control, the illumination light controller 20 controls, based on a difference between a set temperature Ts stored in the memory and the vehicle compartment temperature Td received from the temperature sensor 16, whether or not to turn on the illumination light emitter 22 and which of the emission colors is illuminated by the illumination light emitter 22.

Figure 3:
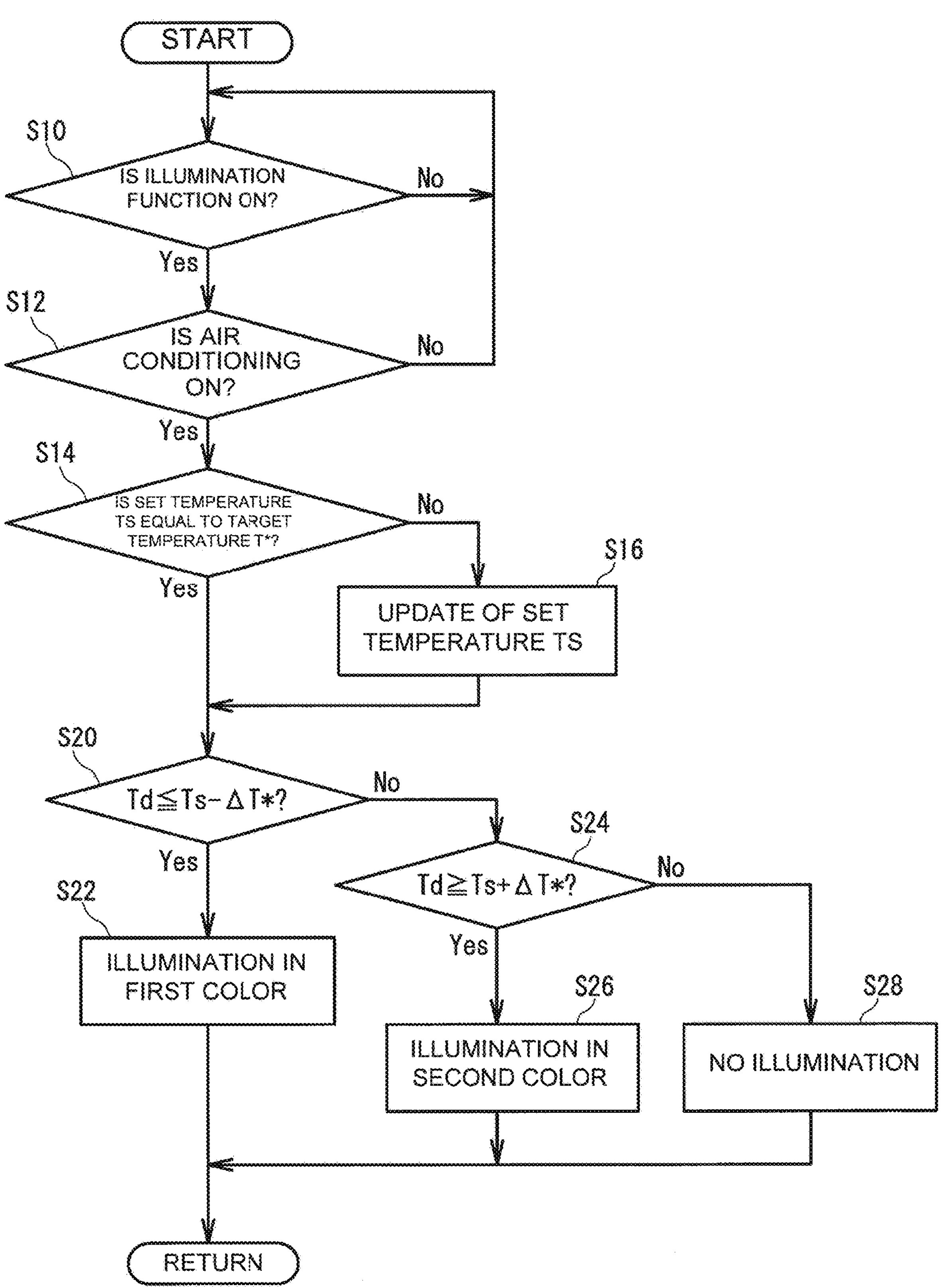
FIG. 3 is a flowchart showing a flow of control performed by an illumination light controller.

FIG. 3 is a flowchart showing a flow of control performed by the illumination light controller 20. As shown in FIG. 3, the illumination light controller 20 monitors the turning on/off of the air conditioning linked illumination control and the turning on/off of the air conditioning (steps S10 and S12). When the instruction to turn on the air conditioning linked illumination control is not provided from the user (NO is determined in step S10), or when an instruction to turn on the air conditioning is not provided (NO is determined in step S12), the illumination light controller 20 does not perform control operation described below.

On the other hand, when the air conditioning linked illumination control is turned on and the air conditioning is turned on (YES in both steps S10 and S12), the illumination light controller 20 compares a value of the desired temperature T* that is notified by the air conditioner controller 18 and a value of the set temperature Ts that is stored in the memory (step S14). When it is found as a result of comparison that the notified value of the desired temperature T* differs from the stored value of the set temperature Ts (NO in step S14), the illumination light controller 20 updates the value of the set temperature Ts stored in the memory using the notified value T* as Ts=T* (step S16). On the other hand, when the result of comparison shows that the desired temperature T* and the set temperature Ts have the same value (YES in step S14), the illumination light controller 20 proceeds to step S20 without changing the value of the set temperature Ts that is stored in the memory.

In step S20, the illumination light controller 20 compares values of the vehicle compartment temperature Td and the set temperature Ts (in steps S20 and S24). When a result of comparison shows that the vehicle compartment temperature Td is lower than the set temperature Ts by an allowable differential ΔT* or more, (YES in step S20), the illumination light controller 20 causes the illumination light emitter 22 to illuminate in a first color (step S22). Here, the allowable differential ΔT* is a predefined value from approximately 1° C. to approximately 4° C., for example, and the first color is a warm color, such as, for example, orange.

In the above-described step, a condition that the vehicle compartment temperature Td is lower than the set temperature Ts by the allowable differential ΔT* or more; i.e., $Td \leq Ts - \Delta T^*$ is satisfied, in most cases, immediately after initiation of heating operation. In such a case, the air conditioner 12 blows heated air into the vehicle compartment to make the vehicle compartment temperature Td approach the desired temperature T* (=the set temperature Ts). Therefore, for the purpose of informing the user that the heated air is being supplied, the illumination light controller 20 causes the illumination light emitter 22 to illuminate in the warm color when the result of $Td \leq Ts - \Delta T^*$ is obtained. This can help the user to intuitively perceive a state of air conditioning, in particular, the differential between the vehicle compartment temperature Td and the desired temperature T*.

On the other hand, when the vehicle compartment temperature Td is higher than the set temperature Ts by the allowable differential ΔT* or more (YES in step S24), the illumination light controller 20 causes the illumination light emitter 22 to illuminate in a second color (step S26). Here, the second color is a cold color, such as sky blue, for example.

In the above step, a condition that the vehicle compartment temperature Td is higher than the set temperature Ts by the allowable differential ΔT* or more; i.e., $Td \geq Ts + \Delta T^*$ is satisfied in most cases immediately after initiation of cooling operation. Under this condition, the air conditioner 12 blows cooled air into the vehicle compartment to make the vehicle compartment temperature Td approach the desired temperature T* (=the set temperature Ts). For the purpose of informing the user of the supply of cold air, the illumination light controller 20 causes the illumination light emitter 22 to illuminate in the cold color. This can allow the user to intuitively perceive the state of air conditioning, in particular, the differential between the desired temperature T* and the vehicle compartment temperature Td.

On the other hand, when the differential between the vehicle compartment temperature Td and the set temperature Ts is smaller than the allowable differential ΔT* (NO in both steps S20 and S24), the illumination light controller 20 causes the illumination light emitter 22 not to illuminate (step S28). This can allow the user to intuitively perceive the vehicle compartment temperature Td approaching the set temperature Ts. It should be noted that when a relationship of |Ts−Td|<ΔT* is satisfied, the illumination light controller 20 may cause the illumination light emitter 22 to illuminate in a third color, rather than not to illuminate. In this case, the third color is an intermediate color between the first color and the second color, and may be white, for example. Also in this case, the user can intuitively recognize that the vehicle compartment temperature Td is approaching the set temperature Ts.

Figure 4:
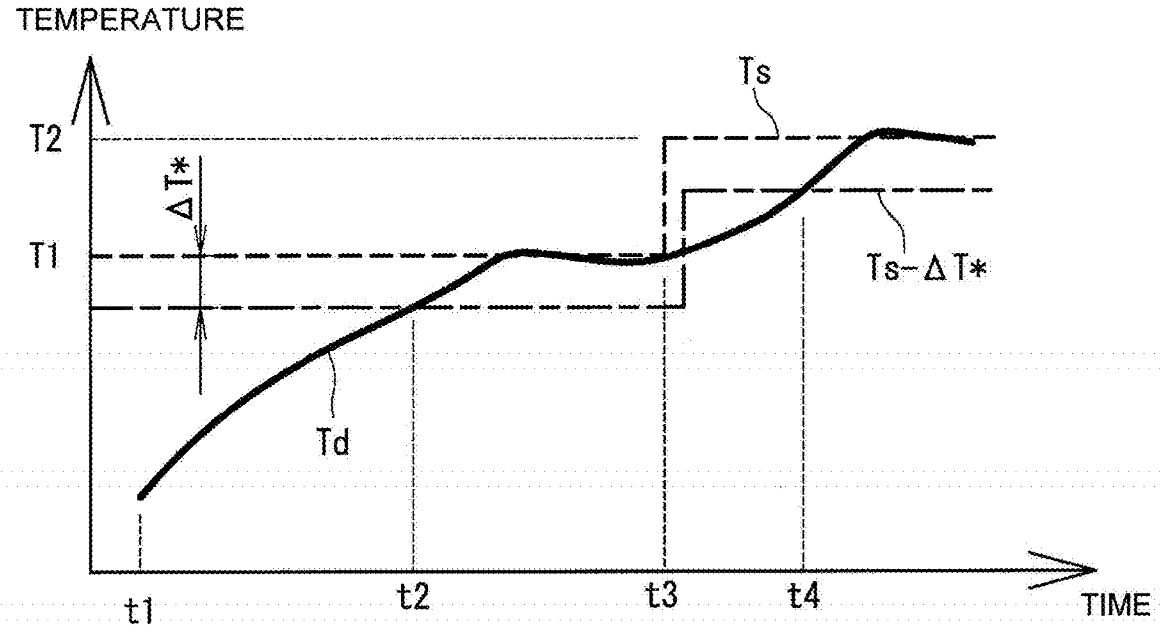
FIG. 4 is a diagram showing an example of the change of an illuminating state of an illumination light emitter during heating operation.
Figure 4:
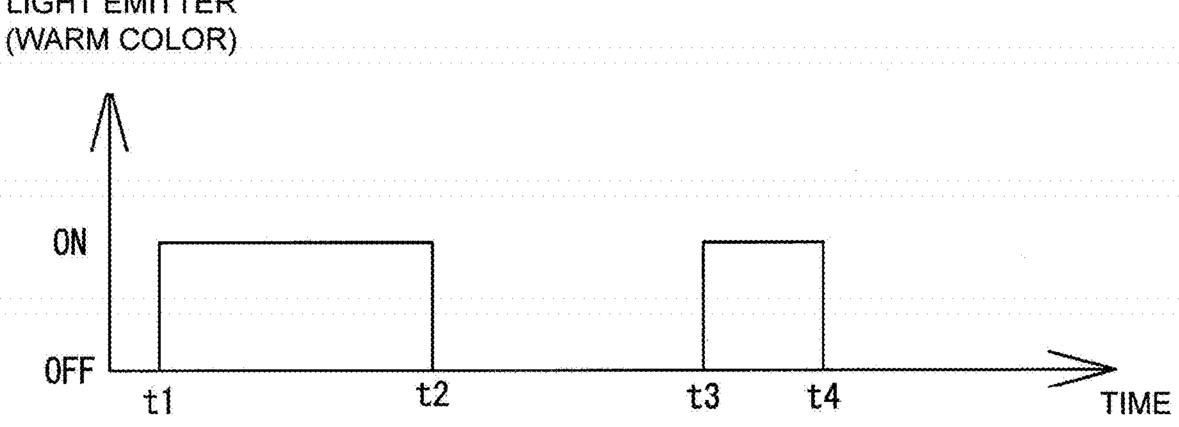

FIG. 4 is a diagram showing an example of the change in the illuminating state of the illumination light emitter 22 during heating operation. The upper part of FIG. 4 shows a change in the vehicle compartment temperature Td, and the lower part of FIG. 4 shows the state of the illumination light emitter 22 illuminating in the warm color. Further, in the upper part of FIG. 4, a thick broken line indicates the set temperature Ts (and thus the desired temperature T*).

In FIG. 4, heating operation is initiated at time t1. At this time, the vehicle compartment temperature Td is significantly lower than the set temperature Ts. Therefore, the air conditioner controller 18 controls the air conditioner 12 to supply the vehicle compartment with heated air. In addition, due to the relationship of Td≤Ts−ΔT*, the illumination light controller 20 operates the illumination light emitter 22 to illuminate in the warm color. This allows the user to intuitively recognize that heating operation is in progress at the present time.

In the example illustrated in FIG. 4, while the heating operation is continuously performed, the vehicle compartment temperature Td gradually increases, and at time t2, the differential between the vehicle compartment temperature Td and the set temperature Ts becomes smaller than the allowable differential ΔT*. In this state, the illumination light controller 20 turns off the illumination light emitter 22. From this, the user can intuitively understand that the vehicle compartment temperature Td approximately reaches the set temperature Ts.

Subsequently, in the example illustrated in FIG. 4, at time t3 the user changes the desired temperature T* from a temperature T1 to a temperature T2. In response to this change, the value of the set temperature Ts is changed from the temperature T1 to the temperature T2, which establishes the relationship of Td≤Ts−ΔT* again. Therefore, in this example, the illumination light controller 20 operates the illumination light emitter 22 to illuminate in the warm color again. Then, at time t4 when the differential between the vehicle compartment temperature Td and the changed set temperature Ts; i.e., the value T2, becomes smaller than the allowable differential ΔT*, the illumination light controller 20 terminates illumination of the illumination light emitter 22. As such, the illuminating state of the illumination light emitter 22 can be changed based on the difference between the set temperature Ts and the vehicle compartment temperature Td, to thereby allow the user to intuitively perceive an operating status of the air conditioner 12.

Figure 5:
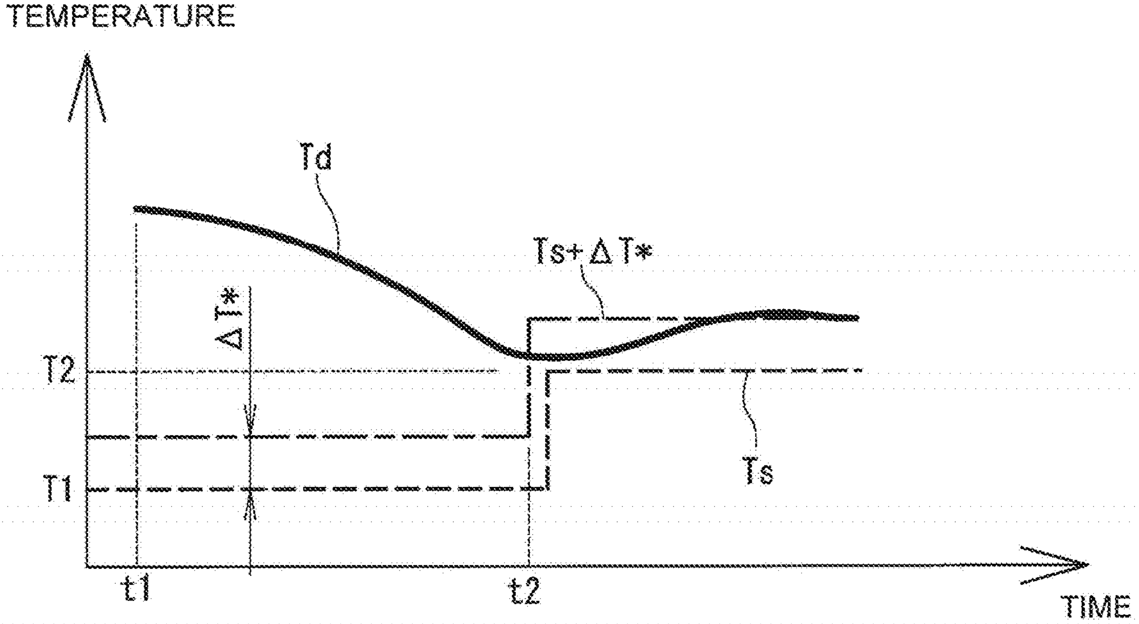
FIG. 5 is a diagram showing an example of the change of the illuminating state of the illumination light emitter during cooling operation.
Figure 5:
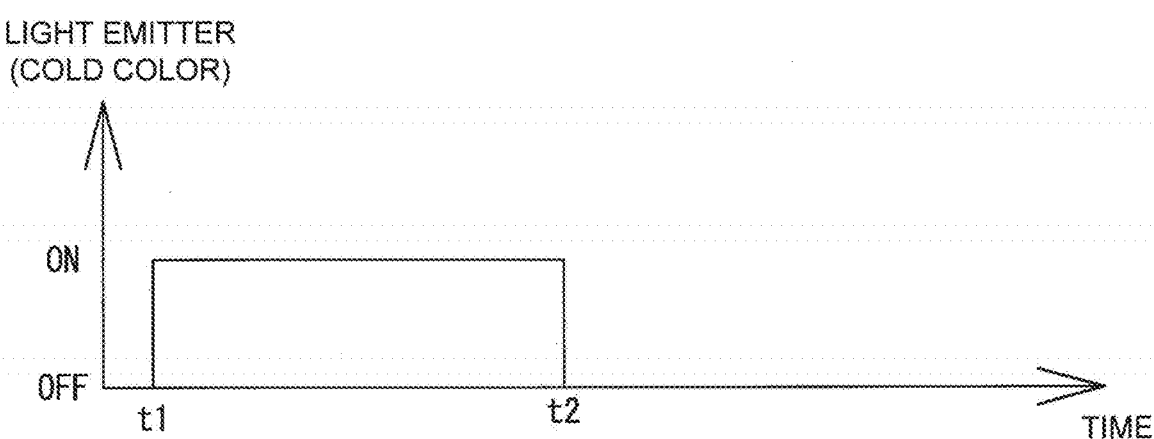

FIG. 5 shows an example of the change in the illuminating state of the illumination light emitter 22 during cooling operation. In FIG. 5, cooling operation is initiated at time t1. At this time, the vehicle compartment temperature Td is significantly higher than the set temperature Ts. Therefore, the air conditioner controller 18 controls the air conditioner 12 to supply the vehicle compartment with cooled air. In addition, due to the relationship of Td≥Ts+ΔT*, the illumination light controller 20 operates the illumination light emitter 22 to illuminate in the cold color. This allows the user to intuitively recognize that cooling operation is in progress at the present time.

Subsequently, in the example illustrated in FIG. 5, at time t2 the user raises the desired temperature T* from a temperature T1 to a temperature T2. In response to the user operation, the value of the set temperature Ts is changed from the temperature T1 to the temperature T2. In the example of FIG. 5, due to the raised set temperature Ts, the differential between the vehicle compartment temperature Td and the set temperature Ts becomes smaller than the allowable differential ΔT*. Therefore, in this example, the illumination light controller 20 terminates illumination of the illumination light emitter 22 at time t2. From this, the user is able to intuitively understand that the vehicle compartment temperature Td approximately reaches the set temperature Ts.

As is evident from the above explanation, because the illuminating state of the illumination light emitter 22 is switched based on the differential between the desired temperature T* and the vehicle compartment temperature Td in this example, it becomes possible for the user to intuitively perceive the operating status of air conditioning.

Meanwhile, a conventional illumination light controller 20 has regularly checked the desired temperature T* (for example, at 1000-msec intervals) and updated the value of the set temperature Ts stored in the memory every time the desired temperature T* is checked. In this case, however, the illumination light controller 20 is required to perform a greater number of rewrites of the memory, which has exerted a greater load on the illumination light controller 20. On the other hand, in the present example, as can be seen from steps S14 and S16 in FIG. 3, the value of the set temperature Ts stored in the memory is rewritten only when the desired temperature T* is changed. In this way, the number of rewrites of the memory performed by the illumination light controller 20 can be decreased, and the load on the illumination light controller 20 can be lightened accordingly.

It should be noted that although the value of the set temperature Ts is compared to the value of the desired temperature T* at regular intervals in the example shown in FIG. 3, it may be the case that such a comparison is performed only when the desired temperature T* is changed by the user. For example, only when a new value is set to the desired temperature T* by the user, the air conditioner controller 18 or the input device 13 transmits to the illumination light controller 20 a change signal indicating that the new value is set to the desired temperature T*. In such a case, the illumination light controller 20 is configured to compare the set temperature Ts and the desired temperature T* only in response to the receipt of the change signal. According to such a configuration, because the number of comparisons and determinations performed by the illumination light controller 20 can be decreased, the load on the illumination light controller 20 can be further lightened.

In addition, the above-described air conditioning linked illumination control may be independently performed on the area-by-area basis in the areas of the vehicle compartment. For example, an instance is considered in which a differential between a vehicle compartment temperature Td detected in the driver seat area and a set temperature Ts for the driver seat area is smaller than the allowable differential ΔT* while a differential between a vehicle compartment temperature Td detected in a front passenger seat area and a set temperature Ts for the front passenger seat area is greater than or equal to the allowable differential ΔT*. In this instance, the illumination light controller 20 may cause the light emitter 22 in the driver seat illuminating light 21*a* not to illuminate and cause the light emitter 22 in the front passenger seat illuminating light 21*b* to illuminate in a predetermined color. As an alternative form, a plurality of light emitters 22 may be synchronously operated to illuminate in the same color at the same timing.

Further, in an example of the embodiment, as long as the difference between the vehicle compartment temperature Td and the set temperature Ts matches or exceeds the allowable differential ΔT*, the illumination light emitter 22 is operated to continuously illuminate in the predetermined color. In other words, the emission color of the illumination light emitter 22 is not frequently changed in this example. This can reduce the number of determinations and signal switching processes performed by the illumination light controller 20, which can, in turn, further lighten the load on the illumination light controller 20. However, the emission color of the illumination light emitter 22 may be changed, of course, based on the magnitude of the temperature differential ΔT between the vehicle compartment temperature Td and the set temperature Ts. For example, the color temperature of the emission color may be decreased (i.e., brought closer to red) as the vehicle compartment temperature Td becomes lower relative to the set temperature Ts, and may be increased (i.e., brought closer to blue) as the vehicle compartment temperature Td becomes higher relative to the set temperature Ts. This allows the user to intuitively recognize the magnitude of the difference between the vehicle compartment temperature Td and the set temperature Ts.

The configuration explained above is presented by way of illustration, and features and configurations other than those defined in claim 1 may be modified or changed. For example, the emission color of the illumination light emitter 22 may be changed as appropriate. Further, the positions and the number of illumination lights 21 may be changed as appropriate.

REFERENCE SIGNS LIST

10 on-board air conditioning system, 12 air conditioner, 14 input device, 16 temperature sensor, 18 air conditioner controller, 20 illumination light controller, 21 illumination light, 22 light emitter, 22 illumination light emitter, 30 driver seat door, 32 passenger seat door, 34 center cluster, T* desired temperature, Td vehicle compartment temperature, Ts set temperature, ΔT* allowable differential.

The invention claimed is:

1. An on-board air conditioning system, comprising:

an air conditioner configured to air condition a vehicle compartment;

an air conditioner controller configured to control the air conditioner so as to match a vehicle compartment temperature to a desired temperature;

at least one illumination light emitter mounted on at least one of a driver seat door, a front passenger seat door, and a center cluster; and an illumination light controller configured to control the at least one illumination light emitter, the illumination light controller having a memory that stores a set temperature, wherein the air conditioner controller is further configured to regularly or irregularly notify the illumination light controller of a value of the desired temperature, and when the value of the desired temperature is set by a user, transmit a change signal to the illumination light controller, the illumination light controller, in response to receipt of the change signal, compares the value of the set temperature stored in the memory with the notified value of the desired temperature, and when the notified value of the desired temperature differs from the value of the set temperature stored in the memory, updates the memory to change the stored value of the set temperature to the notified value of the desired temperature, and under a condition that air conditioning is performed by the air conditioner, the illumination light controller causes the at least one illumination light emitter to illuminate in a first color when the vehicle compartment temperature is lower than the set temperature by a predetermined degree or more, and causes the at least one illumination light emitter to illuminate in a second color different from the first color when the vehicle compartment temperature is higher than the set temperature by the predetermined degree or more.

2. The on-board air conditioning system according to claim 1, wherein:

the first color is one of warm colors, and the second color is one of cold colors.

3. The on-board air conditioning system according to claim 1, wherein the at least one illumination light emitter is disposed on at least one of the driver seat door and the front passenger seat door.

4. The on-board air conditioning system according to claim 1, wherein the illumination light controller causes the at least one illumination light emitter not to illuminate or to illuminate in a third color which is different from both the first color and the second color when a temperature differential between the set temperature and the vehicle compartment temperature is smaller than a predetermined degree.

* * * * *